Figure 1:
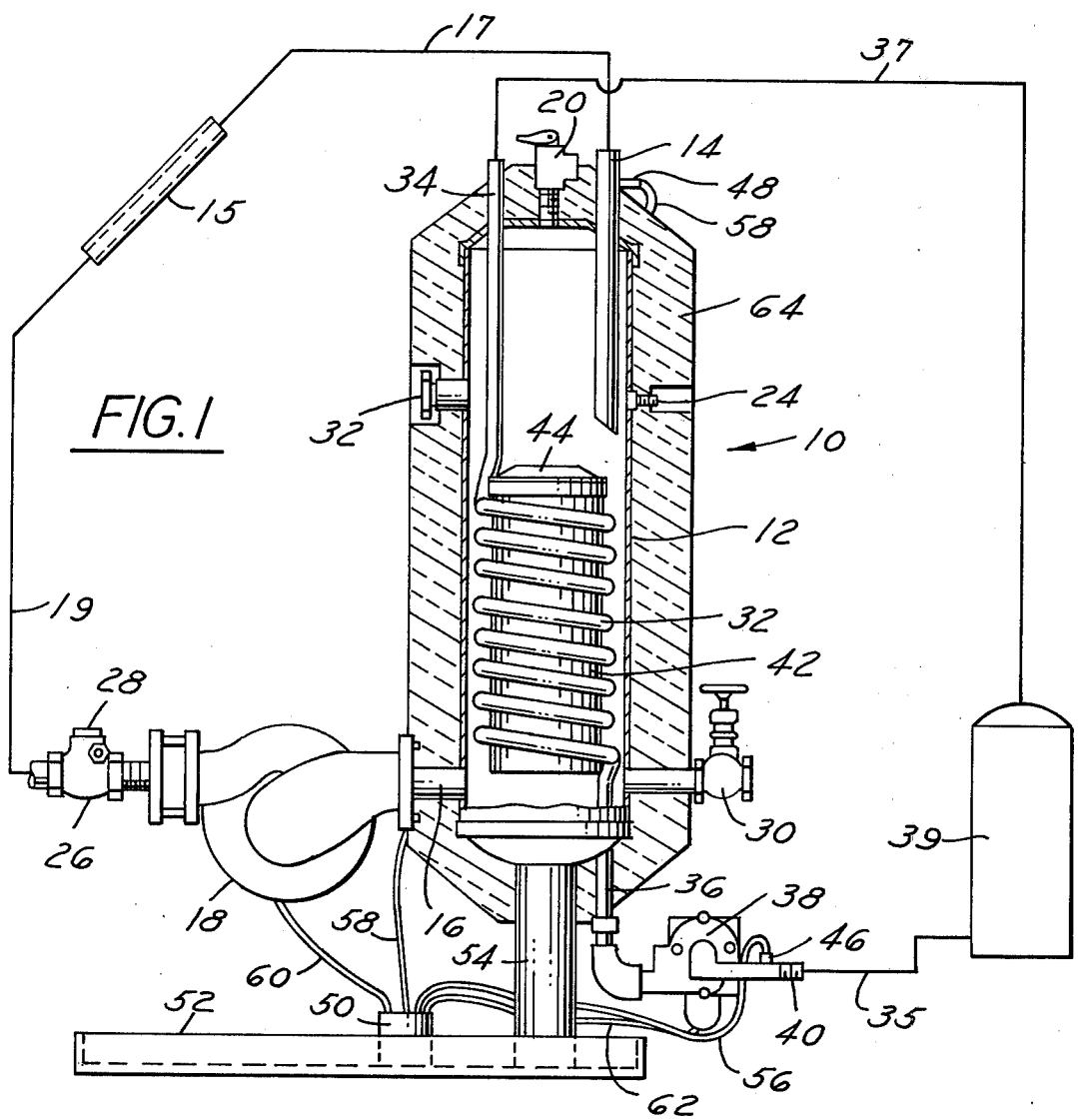

United States Patent [19]

Bottum

[11] 4,130,110
[45] Dec. 19, 1978

[54] SOLAR HEATING SYSTEM COMPONENT AND CONTROL THEREFOR

[76] Inventor: Edward W. Bottum, 9357 Spencer Rd., Brighton, Mich. 48116

[21] Appl. No.: 807,646

[22] Filed: Jun. 20, 1977

[51] Int. Cl.² ............................................... F24J 3/02
[52] U.S. Cl. .................................... 126/271; 237/1 A
[58] Field of Search ........................ 126/271; 237/1 A

[56] References Cited

U.S. PATENT DOCUMENTS

| 3,977,601 | 8/1976 | Bearzi | 126/271 |
| 3,998,207 | 12/1976 | Watt | 126/271 |
| 4,017,028 | 4/1977 | Manor | 126/271 |
| 4,034,738 | 7/1977 | Barber | 126/271 |
| 4,044,948 | 8/1977 | Bottum et al. | 237/1 A |
| 4,060,072 | 11/1977 | Johnson | 237/1 A |

Primary Examiner—Carrol B. Dority, Jr.
Attorney, Agent, or Firm—Whittemore, Hulbert & Belknap

[57] ABSTRACT

The solar heating system component combines a surge tank for a closed solar heat collecting system along with heat exchange means for transferring heat from the primary fluid in the solar heat collecting system to secondary fluid flowing in a secondary circuit which is used for a purpose such as to supply warm water, space heating or cooling, and the like. A control device is provided to cause slower movement of the primary fluid in heat exchange with the secondary fluid when the temperature differential therebetween is low and to increase the rate of said flow when the temperature differential increases.

1 Claim, 2 Drawing Figures

SOLAR HEATING SYSTEM COMPONENT AND CONTROL THEREFOR

BACKGROUND OF THE INVENTION

In U.S. Pat. No. 4,044,948, issued Aug. 30, 1977, there is disclosed a solar water heating package which consists of approximately eight components all hooked up and ready to be connected to solar collectors and a water heater storage tank. The disclosed combination of a heat exchanger, expansion tank, pressure relief valve, filler drain valve, primary pump, flow regulating valve, check valve and differential control provide great convenience in installation in that it is only necessary to connect the solar collectors and the water heater storage tank to this package. Everything else has been hooked up and very little plumbing or electrical work needs to be done. The heat exchanger-expansion tank is even insulated to eliminate that procedure in the field.

The present invention is an improvement over the system described above in the control system therefor. As in the previous water heating package, it uses a differential control. However, in this new embodiment, the differential control has been so designed that when the sun provides just enough heat differential between the collector fluid and the water to be heated, the collector pump will run at a slow speed while the water pump runs at full speed.

It is a well known fact that to provide heat exchange, a temperature difference must first be available. For this reason, the proportional differential control of the present invention starts up the collector pump when the temperature differential is very low, for example, about 3° F. It causes the collector pump to run slowly, thereby maintaining a differential adequate for heat transfer. At this time, even though the collector pump is running slowly, it is advisable to have the water pump run at full speed, increasing fluid velocity in the secondary circuit and thereby helping to further increase the overall ΔT and result in still greater heat transfer. Now, as the sun gets warmer and the difference in temperature in the solar collector and the water temperature raises, for example, to about 12° F., the collector pump will then be running at full speed as well as the water pump. In this way a maximum amount of heat may be picked up and delivered to the heat exchanger. By using a dual output proportional control, efficiency is increased because while the collector circuit pump may run at low speed, the secondary circuit pump will be running at high speed for maximum heat transfer at all times that the primary pump is running. Likewise, when the collector has warmed up due to the intensified heat from the sun, the ΔT in the heat exchanger will be then high enough that the speed of the collector pump may increase and thereby provide greater heat transfer. The water pump runs at full speed at all times that the collector circuit pump is on at all.

The control varies the speed of the collector pump gradually from a slow speed when the ΔT is approximately 3° F up to full speed when the ΔT is perhaps 11° or 12° F. However, at all times the water circuit pump is running at full speed whenever the collector pump is running at any speed. Thus, we have maximum heat transfer through the heat exchanger. It is understood that the temperature difference of 3° F. or 11° or 12° F. are used only as illustrations and that other ΔT's might be used.

SUMMARY OF THE INVENTION

A solar heating system component is provided. The component comprises a closed vessel having a first fluid inlet and a first fluid outlet. The first fluid inlet is adapted for connection to the fluid outlet of a solar energy collection system through which fluid flows in a closed system as a heat exchange medium. The first fluid outlet is adapted for connection to the fluid inlet of the solar energy collection system. The vessel defines an expansion tank for the solar energy collection system. A second fluid inlet and a second fluid outlet are provided on the vessel. The second fluid inlet is adapted to receive a fluid to be heated. The second fluid outlet is adapted to forward such heated fluid to a point of use. A heat exchange structure is provided within the vessel and positioned for heat exchange relationship with solar energy collection system fluid in the vessel. The heat exchange structure includes means for fluid flow therethrough. The second fluid inlet and outlet are operably connected to the heat exchange structure.

The heating system component is improved by a control device. A first variable speed electric motor driven fluid pump is connected to the second fluid outlet and a second electric motor driven fluid pump is connected to the second fluid inlet for circulation of fluid through the respective systems. A first temperature sensor is located to sense the temperature at the collector outlet. A second temperature sensor is located to sense the temperature of fluid pumped by the second pump. A control device is connected to the first and second sensors. Means operably connect the control device to the motors of the pumps to energize the pumps when the differential temperature of fluids being pumped by the pumps reaches a predetermined minimum valve. The control device includes means to cause the variable speed electric motor to run at low speed when the differential temperature of fluids being pumped by the pumps reaches a predetermined minimum valve. The control device including means to cause the variable speed electric motor to run at low speed when the differential temperature of the fluids is at the predetermined minimum and to increase the speed thereof when the temperature differential increases.

IN THE DRAWINGS

Figure 2:
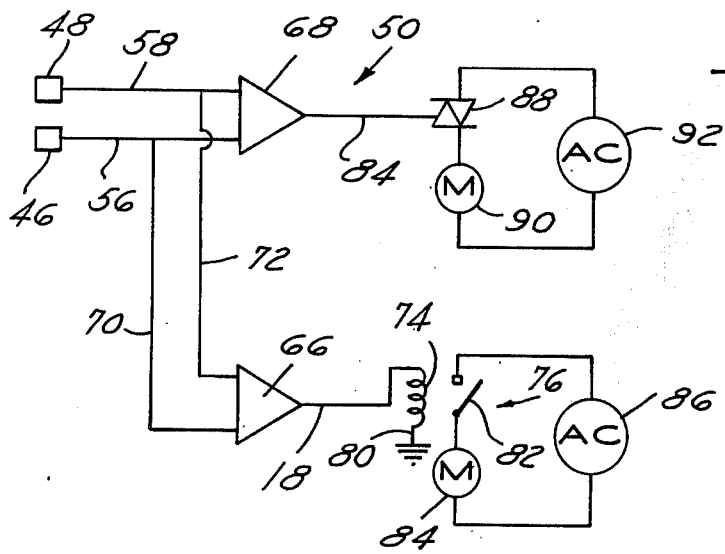

FIG. 1 is an elevational view in section of one embodiment of the solar heating system component in accordance with the present invention; and FIG. 2 is a schematic view of the electrical control system for the solar heating system component of FIG. 1.

Referring to FIG. 1, the solar heating system component 10 includes a closed vessel 12. The vessel 12 is indicated as being elongated with the longitudinal axis thereof being substantially vertical although this orientation may be changed as desired for a particular application.

There are two inlets and two outlets on the vessel 12. One inlet 14 and one outlet 16 are adapted to be connected to a solar heating system. Such a solar heating system includes one or more solar collectors 15 and other necessary components. Solar collectors are used to convert the sun's rays into heat energy. One type of conventional collector includes a flat plate to which is attached a metallic tubular coil. The flat plate is adapted to collect the sun's rays, convert these rays to heat energy and conduct this heat energy to the tubular coil. A fluid, either a gas or liquid, is circulated through the coils. The fluid is heated in the process. The fluid may contain an antifreeze or corrosion inhibitor. The heat fluid is transported from the collector means into the vessel 12 via line 17 to inlet 14. Fluid from which heat has been extracted is pumped from the vessel 12 via line 19 from outlet 16 by means of an electric motor driven pump 18. The pump 18 causes the fluid to circulate through the system.

The vessel 12 serves as an expansion tank for the fluid circulated in the primary solar heat energy collecting system. It is necessary in such a closed system to have an expansion tank in order to compensate for volume changes in the circulated fluid which occur as a result of temperature changes in the ambient atmosphere. It will be appreciated that solar collectors are of necessity located outdoors and are subject to the constantly changing ambient temperature.

Attached to the vessel 12 are a pressure relief valve 20, a sight glass 22, and an air valve 24, all of which are used in conjunction with the closed solar heat energy collecting system. Two sight glasses may be provided instead of only one. The pressure relief valve 20 is necessary in a closed system. As will be noted, the pressure relief valve 20 is located on the top of the vessel 12. There is an air pocket above the fluid in vessel 12 so that if it is necessary to relieve pressure in the system, pressure relief will be gained via release of air rather than the fluid in the system.

The system may be installed in the field by connecting the inlet 14 and pump outlet fitting 26 to the solar collector system by means of suitable pipe, tube or hose. The system is easily charged with its operative fluid by attaching a filling hose to inlet 28 of fitting 26. The fluid will not flow back through the pump 18 but will flow in the direction of the solar collector system and from the solar collector system into the vessel 12 via inlet 14. The desired level in the vessel 12 may be determined by means of the sight glass 22. After the system has been charged, the pump 18 may be operated, permitting air trapped in the solar collector system to accumulate in the vessel 12. If the level in the vessel 12 is too low, air valve 24 may be opened to permit some of the compressed air to escape to the ambient atmosphere whereupon the air pressure within vessel 12 will be reduced, permitting the fluid level in vessel 12 to rise. The air valve 24 illustrated is a conventional SAE flair fitting containing a "Schraeder" type tire valve stem. If, however, the design of the solar collector systems causes excessive entrapment of air, a vent valve may be necessary on the collectors.

Manually operable valve 30 is provided in the lower portion of vessel 12. The system may be discharged by opening of valve 30. Additionally, valve 30 may be opened to permit an amount of the fluid charge to escape in the event it is desired to reduce the level in vessel 12.

A tubular coil 32 is provided interiorly of vessel 12. An inlet section 36 and outlet section 34 extend from the lower and upper ends of the coil 32, respectively. An electric motor driven pump 38 is provided on inlet 36 for the circulation of fluid, normally pure water, to the intended location of use of heated fluid. The inlet 40 of pump 38 and the outlet 34 are connected by lines 35, 37 to hot water tank 39 where water is ultimately used. The ultimate use might be, alternately, to supply warm water for use in space heating or other like uses.

A tubular member 42 having an upper cap 44 is received within the coil 32. The outer diameter of tubular member 42 is equal to the inner diameter of the coil so that the tubular member 42 fits snugly within the coil. The function of the tubular member 42 is to increase the velocity of fluid passing over the coil and thereby improve heat transfer.

The vessel 12 is substantially covered externally with insulating material 64. Openings are provided, however, for actuation of air valve 24 and display of sight glass 22.

A temperature sensor 46 is provided on the inlet of the pump 38 and a second sensor 48 is provided on the inlet 14 which is substantially at the temperature of the solar collector outlet. A control device 50 is mounted on base support element 52. The vessel 12 is supported on the base element 52 by means of a short post 54. It will be noted that the vessel 12 is located adjacent one end of the base element 52 so as to balance the weight of the vessel and pump 18 to thereby provide the stable support.

The sensors 46, 48 are connected to the control device 50 by means of leads 56, 58. Additional leads 60, 62 extend from the control device to the electric motors 61, 63 which drive the pumps 18, 38.

The control device 50 is illustrated in FIG. 2. As there shown, the electrical signals generated by the temperature sensors 46, 48 are fed to comparators 66, 68 via leads 56, 58 and branch leads 70, 72. These input signals, which vary in accordance with the temperatures recorded, are compared in the comparators 66, 68.

The difference in the signals, which represents the difference in the respective temperatures, is reflected in the outputs of the comparators.

The output of comparator 66 is fed to coil 74 of a relay 76 via lead 78. Coil 74 is grounded by lead 80. When the difference between the two temperatures is adequate for satisfactory heat exchange to take place, for purposes of illustration only, 3° F., a signal from comparator 66 is emitted to cause closing of contacts 82. This results in closing the circuit through pump 38, motor 84 and AC power source 86 with the result that pump 38 is run at its normal rated capacity, causing the fluid flow through coil 32. If the temperature differential is not sufficient for a satisfactory heat exchange to take place, then the contacts 82 will not close.

Comparator 68 also emits a signal on lead 84 after comparision of the signals from temperature sensors 46, 48. This signal is proportionate to the differences in the temperatures of fluid in the two systems. If this difference is sufficient to permit satisfactory heat exchange, then solid state switch 88 is caused to conduct. The solid state switch 88 will conduct in either direction at a level in accordance with the applied signal.

The electrical motor 90 for pump 18 ia a variable speed motor. Conduction of switch 88 closes the circuit through AC power source 92. If the temperature differential between the fluids in the two systems is small, say 3° F., the switch 88 permits operation of motor 90 at a low speed. This results in slower movement of fluid through vessel 12, permitting more time for heat exchange. If the temperature differential is large, say 12° F., then motor 90 is permitted to run at full speed, resulting in faster flow of fluid through vessel 12, reducing the time the fluids of the two systems are in heat exchange relationship.

It will be appreciated that the working temperature differential range given above are for purposes of illustration only.

This variation in time for heat exchange between the two fluids results in superior operation of the unit.

Having thus described my invention, I claim:

1. In a solar heating system component comprising a closed vessel, a first fluid inlet and a first fluid outlet for said vessel, said first fluid inlet being adapted for connection to the fluid outlet of a solar energy collection system through which fluid flows in a closed system as a heat exchange medium, said first fluid outlet being adapted for connection to the fluid inlet of said solar energy collection system, said vessel defining an expansion tank for said solar energy collection system, a second fluid inlet and a second fluid outlet for said vessel, said second fluid outlet being adapted to forward such heated fluid to a point of use, and a heat exchange structure within the vessel positioned for heat exchange relationship to solar energy collector system fluid in the vessel, said heat exchange structure including means for fluid flow therethrough, said second fluid inlet and outlet being operably connected to said heat exchange structure, the improvement comprising a variable speed electric motor driven first fluid pump connected to said first fluid outlet and a second electric motor driven fluid pump connected to said second fluid inlet for circulation of fluid pump through the respective systems, a first temperature sensor located to sense the temperature at the collector outlet, a second temperature sensor located to sense the temperature of fluid pumped by said second pump, a control device connected to said first and second sensors, means operably connecting said control device to the motors of said pumps to energize said pumps when the differential temperature of fluids being pumped by said pumps reaches a predetermined minimum valve, said control device including means to cause said variable speed electric motor to run at low speed when said differential temperature of said fluids is at said predetermined minimum and to increase the speed thereof when said temperature differential increases, said control device including means to cause said electric motor of said second fluid pump to run at a constant speed.

* * * * *